United States Patent [19]

Cox et al.

[11] Patent Number: 5,024,632
[45] Date of Patent: Jun. 18, 1991

[54] TRANSMISSION SHAFT WITH SHEAR SECTION AND DEBRIS RETAINER

[75] Inventors: Vernon F. Cox, Somerton; Phillip M. Hyde, Crewkerne, both of England

[73] Assignee: Westland Helicopters Limited, Yeovil, England

[21] Appl. No.: 435,715

[22] Filed: Nov. 14, 1989

[30] Foreign Application Priority Data

Nov. 21, 1988 [GB] United Kingdom ................ 8827169

[51] Int. Cl.$^5$ ............................................. F16D 9/00
[52] U.S. Cl. ..................................... 464/33; 403/2; 403/11
[58] Field of Search .................... 74/608, 609, 612; 403/2, 11, 23, 50, 51; 464/30, 32, 33, 170, 173

[56] References Cited

U.S. PATENT DOCUMENTS

| | | | |
|---|---|---|---|
| 1,637,944 | 8/1927 | Keller | 464/33 |
| 3,126,723 | 3/1964 | Dugay | 464/33 |
| 3,551,012 | 12/1970 | Sutliff et al. | 403/11 |
| 3,753,625 | 8/1973 | Fabrizio et al. | 464/33 X |
| 4,055,967 | 11/1977 | Terranova et al. | 464/33 X |
| 4,411,546 | 10/1983 | Fischer | 403/2 X |

FOREIGN PATENT DOCUMENTS

| | | | |
|---|---|---|---|
| 2315036 | 1/1977 | France | 464/32 |
| 60-44622 | 3/1985 | Japan | 464/32 |

Primary Examiner—Daniel P. Stodola
Attorney, Agent, or Firm—Larson & Taylor

[57] ABSTRACT

A transmission shaft having a shear neck portion adapted to attract failure of the shaft in the event of an overload includes an annular retainer to retain debris resulting from a failure of the shaft.

9 Claims, 2 Drawing Sheets

TRANSMISSION SHAFT WITH SHEAR SECTION AND DEBRIS RETAINER

BACKGROUND OF THE INVENTION

1. Field of the Invention

This invention relates to transmission shafts and is particularly concerned with shafts for transmitting rotary motion.

2. Description of the Prior Art

It is known to provide, in such shafts, a circumferential recess in an external surface to purposely provide a weak spot which will attract a failure in the event of an overload of the shaft. Such a recess is known in the art as a shear neck.

Shear necks are used to protect valuable components from damage in the event of failure in a transmission system and are used, for example, in the transmission shafts in an accessory drive gearbox in a helicopter for driving accessories such as hydraulic pumps, generators etc. Thus a failure in one of the driven accessories will result in a failure at the shear neck in its particular drive shaft only and will not result directly in damage to other components of the system.

One of the problems in the use of existing shear necked transmission shafts is that debris from a failure is likely to contaminate the associated gearbox which may at best necessitate flushing the lubrication system and at worst damage other major gearbox components and necessitate a complete strip and clean operation.

SUMMARY OF THE INVENTION

It is therefore an object of this invention to provide a shear necked transmission shaft wherein debris resulting from a failure is prevented from contaminating a gearbox in which it is fitted.

Accordingly this invention provides a transmission shaft for transmitting rotary movement having a shear neck portion comprising a circumferential recess in the external surface of the shaft to attract a failure in the event of overload of the shaft, and debris retention means comprising an annular retainer having one end portion rotationally fixed to the external surface of the shaft at one side of said shear neck and its other end portion slidingly engaged with the surface of the shaft at the other side of said shear neck.

Preferably the annular retainer has an internally concave shape between said end portions so as to define with the external surface of said shaft a debris retaining cavity.

The annular retainer may be flexible and may include resilient means for pressing said slidingly engaged end portion against the shaft surface.

The resilient means may include a resilient ring in said slidingly engaged portion. The annular retainer may include a stiffener to assist retention of its internally concave shape, and may be a rubber retainer.

Alternatively, said annular retainer may be a rigid retainer and may include a resilient seal between the slidingly engaged end portion and the external surface of the shaft. Conveniently the seal may be retained between an inwardly protruding lip on the retainer and a circlip.

In such an alternative embodiment the annular retainer may be a metal retainer.

An annular outwardly protruding lip may be provided on the external surface of the shaft between said shear neck and the slidingly engaged end portion of the annular retainer so as to simplify removal of both parts of a broken shaft whilst effectively retaining debris.

BRIEF DESCRIPTION OF THE DRAWINGS

The invention will now be described by way of example only and with reference to the accompanying drawings in which.

DETAILED DESCRIPTION OF THE DRAWINGS

Figure 1:
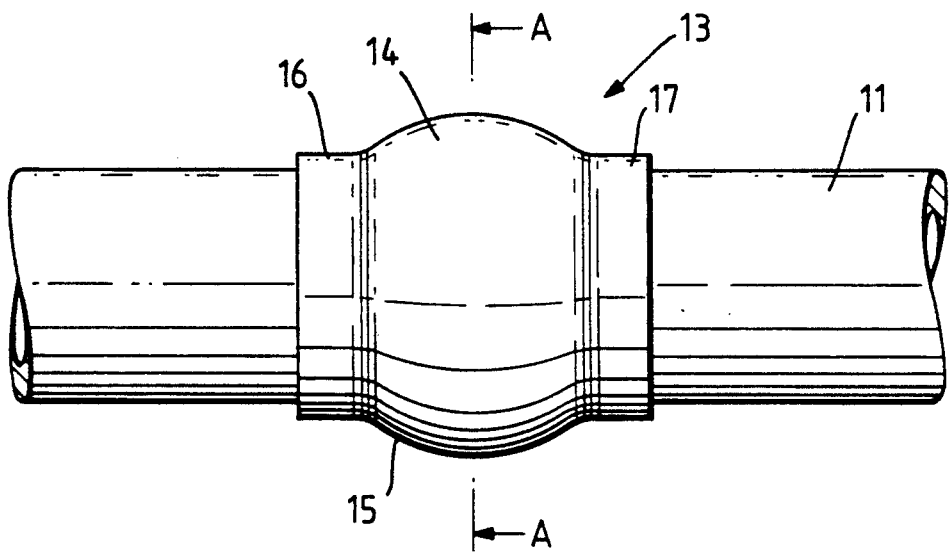
FIG. 1 is a fragmentary side view of a transmission shaft constructed according to one embodiment of the invention.
Figure 2:
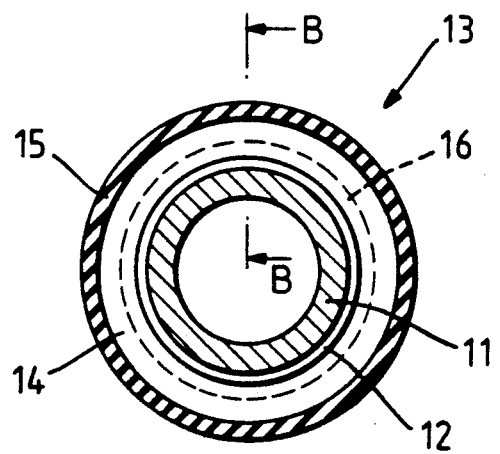
FIG. 2 is a sectioned view taken on lines A—A of FIG. 1.
Figure 3:
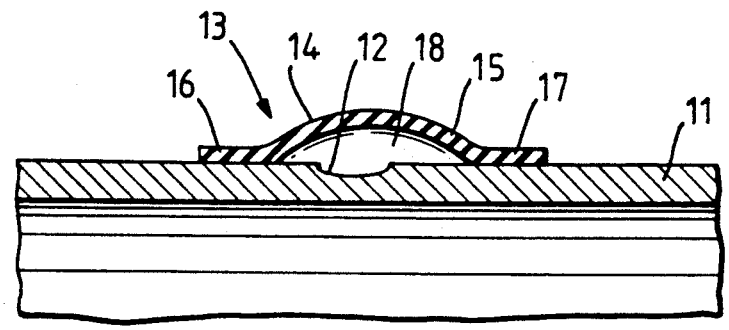
FIG. 3 is a fragmentary sectioned view taken on lines B—B of FIG. 2.

Referring now to FIGS. 1, 2 and 3, a tubular transmission shaft 11 for transmitting rotary motion is provided with a shear neck comprising a circumferential recess 12 in an external surface.

Debris retention means generally indicated at 13 is located externally of the shaft 11 in the vicinity of the shear neck. The retention means comprises an annular rubber retainer 14 having a central internally concave curved portion 15 and generally flat axially extending end portions 16 and 17.

End portion 16 of retainer 14 is bonded to the external surface of the shaft 11 at one side of the shear neck 12 so that the retainer 15 rotates with the shaft 11, and the other end portion 17 is slidingly engaged with the external surface of the shaft 11 at the other side of the shear neck 12. Consequently, in normal operation, no relative movement occurs because the end portion 17 rotates with the shaft 11.

The internal concave shape of the central portion 15 of retainer 14 defines with the shear neck portion 12 of shaft 11 a debris retaining cavity 18.

Figure 4:
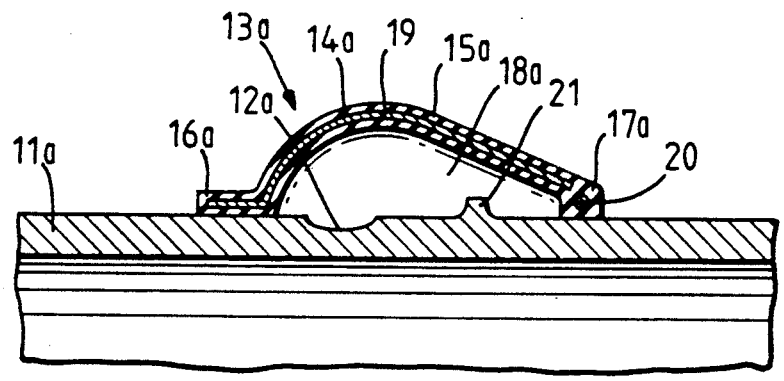
FIG. 4 is a fragmentary sectioned view similar to FIG. 3 showing another form of the invention.

In the form of the invention of FIG. 4, the flexible rubber retainer 14a includes an internal metal stiffener 19 and a resilient metal ring 20 is bonded into the end portion 17a that is slidingly engaged with the surface of the shaft 11a. Additionally, in FIG. 4, an annular outwardly protruding lip 21 is provided on the external surface of the shaft between the shear neck 12a and the end 17a of the retainer 14a.

Figure 5:
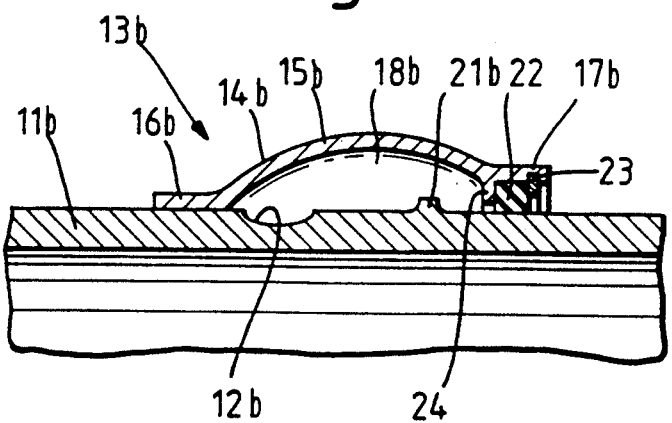
FIG. 5 is a fragmentary sectioned view similar to FIGS. 3 and 4 showing yet another form of the invention.

FIG. 5 illustrates a further form of the invention in which the annular retainer 14b is constructed of an alternative material such as for example steel, titanium, aluminium or composite materials and a rubber seal 22 is provided between end portion 17b and the shaft and is retained between an inwardly protruding annular lip 24 on the retainer 14 internally of the seal 22 and a circlip 23. The outwardly protruding lip 21b is retained in this embodiment.

In the event of overload the transmission shaft 11 of this invention is designed to fail at the shear neck 12. Debris from the shear neck portion 12 is centrifuged outwardly and retained in the cavity 18 defined in part by the central internally concave portion 15 of annular retainer 14. Thus, the debris can be removed effectively during replacement of the failed shaft 11 without the risk of contaminating the gearbox in which it is fitted so as to obviate damage to other gearbox components and the requirement for high cost and time consuming maintenance activities such as a full strip or lubricant flushing.

In the form of the invention illustrated in FIG. 4 the stiffener 19 assists retention of the internal concave shape of the retainer, and ring 20 provides a resilient force pressing end portion 17a against the surface of shaft 11a. These features are useful firstly in ensuring effective retention of debris in cavity 18a and, secondly, during withdrawl of a failed shaft 11a.

Thus, in the latter case, interaction between the end portion 17a and the lip 21 will assist in withdrawing the two parts of failed shaft 11a as a single unit to reduce the risk of contamination of a gearbox by debris during removal of the parts.

In addition, the lip 21 will assist centrifuging of the debris into the cavity 18b.

The retainer 14b of FIG. 5 provides similar operational facilities to those of FIG. 2, and the inwardly extending lip 24 protects the seal 22 from the ingress of debris in the event of a failure of shaft 11b to maintain efficient debris retention.

Operationally, this invention, especially the embodiments of FIGS. 4 and 5, is also useful in preserving the integrity of a failed shaft by retaining alignment of the separated parts within the gearbox to prevent damage that could otherwise occur due to misalignment of the failed shaft parts.

Whilst several embodiments of the invention have been described and illustrated it will be understood that many modifications may be made without departing from the scope of the invention as defined in the appended claims. For example, the retainer 14 may be constructed of any other suitable material and portion 15 may be linear or of other suitable internally concave shape. The stiffener 19 in the embodiment of FIG. 4 may be of any other suitable material for example composite material. The end portion 16 of retainer 14 may be rotationally fixed to shaft 11 by any other suitable means.

What is claimed is:

1. A transmission shaft for transmitting rotary movement includes a shear neck portion comprising a circumferential recess in the external surface of the shaft to attract a failure in the event of overload of the shaft and debris retention means comprising an annular retainer having one end portion rotationally fixed to the external surface of the shaft at one side of the shear neck portion and the other end portion of said annular retainer slidingly engaged with the surface of the shaft at the other side of the shear neck portion, said annular retainer having an internally concave shape between said end portions so as to define with the external surface of the shaft a debris retaining cavity.

2. A shaft as claimed in claim 1, wherein an annular outwardly protruding lip is provided on the external surface of the shaft between the shear neck portion and the slidingly engaged end portion.

3. A shaft as claimed in claim 1, wherein said retainer is flexible and includes resilient means for pressing the slidingly engaged end portion against the surface of the shaft.

4. A shaft as claimed in claim 3, wherein said resilient means includes a resilient ring in said slidingly engaged end portion.

5. A shaft as claimed in claim 3, wherein said retainer includes a stiffener.

6. A shaft as claimed in claim 1, wherein said annular retainer is a rubber retainer.

7. A shaft as claimed in claim 1, wherein said annular retainer is a rigid retainer and includes a resilient seal between said slidingly engaged end portion and the external surface of the shaft.

8. A shaft as claimed in claim 7, wherein said seal is retained between an inwardly protruding lip on the retainer and a circlip.

9. A shaft as claimed in claim 7, wherein said annular retainer is a metal retainer.

* * * * *